(12) United States Patent
Kim

(10) Patent No.: US 6,393,969 B1
(45) Date of Patent: May 28, 2002

(54) EGG ROASTER

(76) Inventor: Gab Soon Kim, 12104 Park St., Cerritos, CA (US) 90703

( * ) Notice: Subject to any disclaimer, the term of this patent is extended or adjusted under 35 U.S.C. 154(b) by 0 days.

(21) Appl. No.: 09/976,824

(22) Filed: Oct. 13, 2001

(51) Int. Cl.[7] .......................... A47J 37/00; A47J 37/06; A47J 27/00; A47J 27/04; F27D 11/00
(52) U.S. Cl. ............................ 99/331; 99/339; 99/340; 99/440; 99/448; 99/476; 99/483; 219/393; 219/494; 219/400
(58) Field of Search ................... 99/326–333, 339, 99/340, 422, 400, 401, 444–450, 473–476, 483; 219/400, 401, 440, 392, 393, 396, 452.13, 472, 474, 492, 494, 497; 126/369, 20; 426/510, 511, 523

(56) References Cited

U.S. PATENT DOCUMENTS

| | | | | |
|---|---|---|---|---|
| 3,580,164 A | * | 5/1971 | Baker | 99/339 |
| 3,604,338 A | * | 9/1971 | Fiedler | 99/339 |
| 3,611,913 A | * | 10/1971 | McGinley | 99/423 |
| 3,965,808 A | * | 6/1976 | Chomette | 99/483 X |
| 3,987,718 A | * | 10/1976 | Lang-Ree et al. | 99/339 X |
| 4,189,631 A | * | 2/1980 | Baker et al. | 99/339 |
| 4,254,697 A | * | 3/1981 | Lang-Ree et al. | 99/401 X |
| 4,421,015 A | * | 12/1983 | Masters et al. | 99/339 X |
| 4,572,061 A | * | 2/1986 | Masters et al. | 219/400 X |
| 4,739,154 A | * | 4/1988 | Bharara et al. | 219/400 X |
| 5,235,903 A | * | 8/1993 | Tippmann | 99/331 |
| 5,309,824 A | * | 5/1994 | Dromgoole et al. | 99/357 X |
| 5,380,986 A | * | 1/1995 | Mullen | 99/357 X |

* cited by examiner

Primary Examiner—Timothy F. Simone
(74) Attorney, Agent, or Firm—Jerry H. Noh

(57) ABSTRACT

An egg roaster for roasting eggs using an electric heater is disclosed. An internal air circulator is provided in an insulation chamber in which is mounted guide shelves for egg loading and forcing circulation and diffusion of an internal air to evenly roast the eggs. An air discharge unit forceably discharges the internal air to prevent egg burning and dewing from moisture. An external air influx member administers the supply of external air.

10 Claims, 2 Drawing Sheets

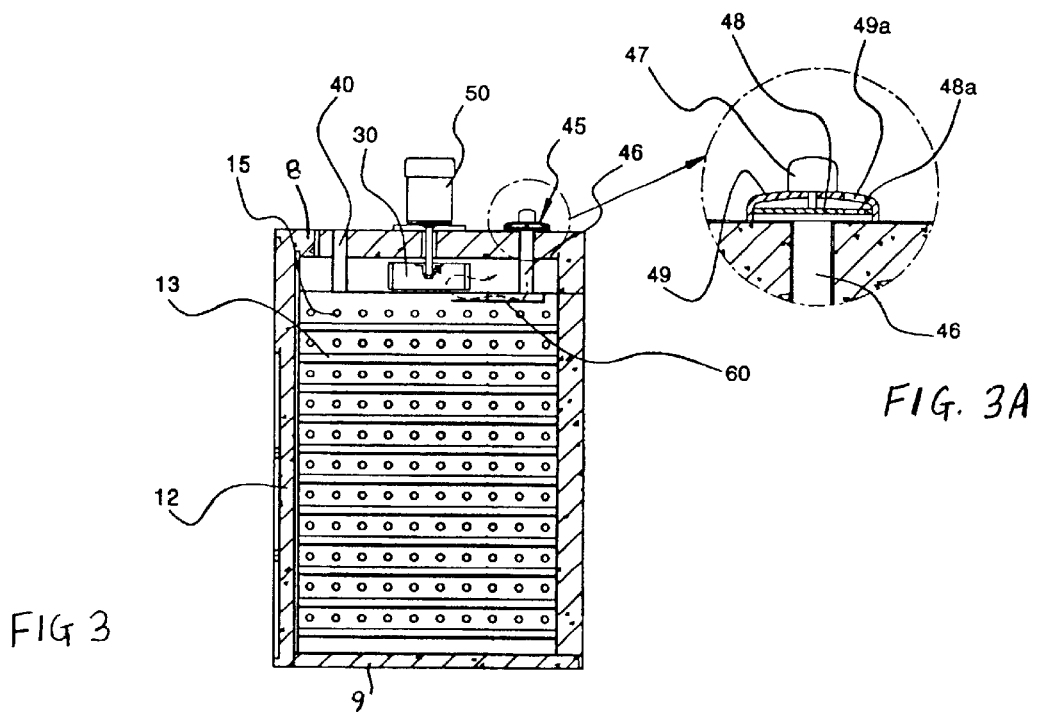
FIG. 3
FIG. 3A
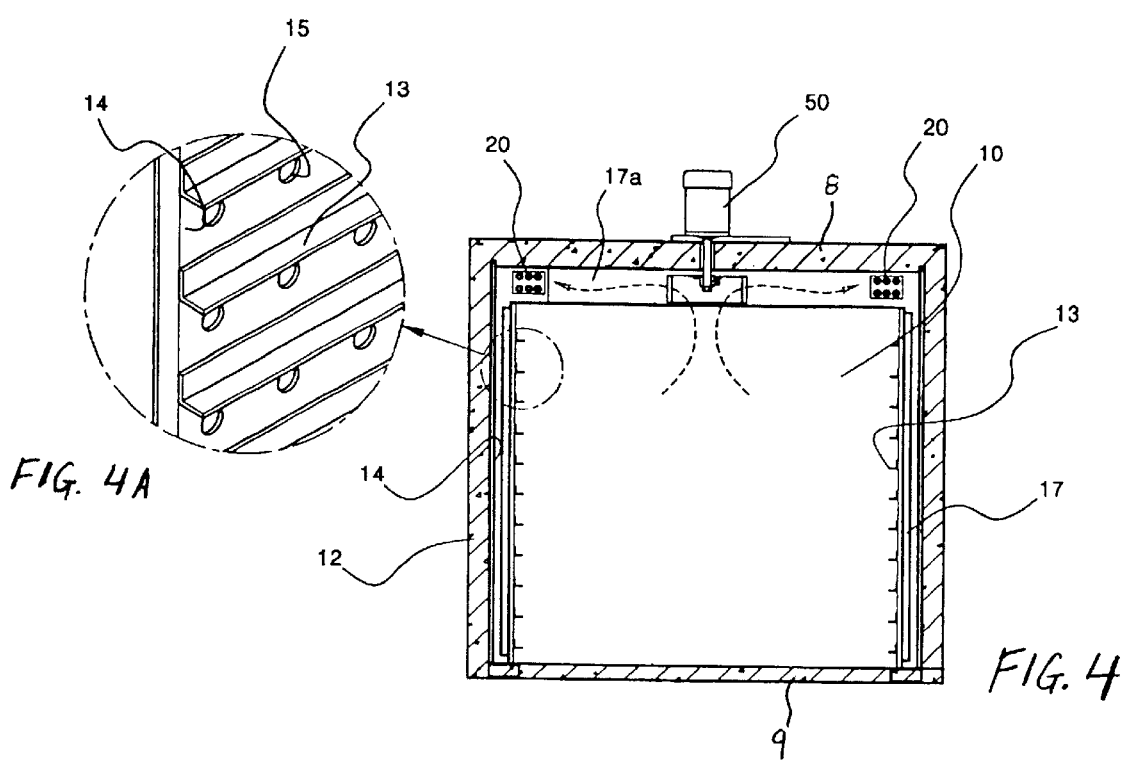
FIG. 4A
FIG. 4

EGG ROASTER

BACKGROUND OF THE INVENTION

The present invention relates to a roaster. More particularly, the present invention relates to an improved egg roaster improving nutrition factors in eggs by roasting unpeeled eggs using air circulation mechanism.

Eggs are known to contain substantial amount of proteins, carbohydrates, fats, vitamins and others. Among the kinds of eggs, rooster eggs and quail eggs apply to commercial mass production.

Raw eggs include relatively large amounts of moisture which makes it feasible for germs to easily propagate and decrease storage period due tot the ease of decay. As such, raw eggs need care to maintain freshness. Since eggs serve as an important low-cost source of nutrition, they are a critical part of the diet for many millions of individuals.

Boiled eggs or fried eggs are no better than raw eggs in terms of storage period and vulnerability to germs. In order to prevent the problems, Korea Patent Publication No. 93-8103 discloses an egg processing method, wherein eggs are soaked in solution mixed and diluted at the ratio of water 100 weight %, carbon magnesium 2–3 weight %, carbon natrium 3–4 weight %, NaCl 1.5–2.5 weight % and processed for at least 18 days at relatively low temperature of 23–28 Celsius degrees and then steamed at 35–42 Celsius degrees, thereby enabling egg storage for about three months at room temperature. However, the length of egg processing period lowers productivity and hinders commercial application.

Also, Korea Patent Publication No. 98-43797 discloses soaking and maturing for a predetermined time period using yellow soil and herbs. Although this may improve medication effects, extension of storage period is not expected.

None of the prior art roaster discloses a device as taught in the present invention.

SUMMARY OF THE INVENTION

Accordingly, it is an object of the present invention to provide an egg roaster which effectively roasts bulk quantities of egg.

To achieve the above-described object, the egg roaster according to the present invention comprises an egg roaster for roasting eggs using an electric heater, an internal air circulator provided in an insulation chamber in which is mounted guide shelves for egg loading and forcing circulation and diffusion of an internal air to evenly roast the eggs, an air discharge unit for forceably discharging the internal air to prevent egg burning and dewing from moisture, and an external air influx member for adjusting the supply of air entering from the external environment.

BRIEF DESCRIPTION OF THE DRAWINGS

These and other features, aspects and advantages of the present invention will become better understood with reference to the accompanying drawings, wherein:

FIG. 3 is a vertical cross-sectional front view of FIG. 1;

FIG. 3a is a partial enlarged view of the corresponding portion shown in FIG. 3;

FIG. 4 is a vertical cross-sectional side view of FIG. 1 showing the inner wall of FIG. 3A; and, FIG. 4a is a partial enlarged view of the corresponding portion shown in FIG. 4.

DETAILED DESCRIPTION OF THE PREFERRED EMBODIMENTS

Figure 1:
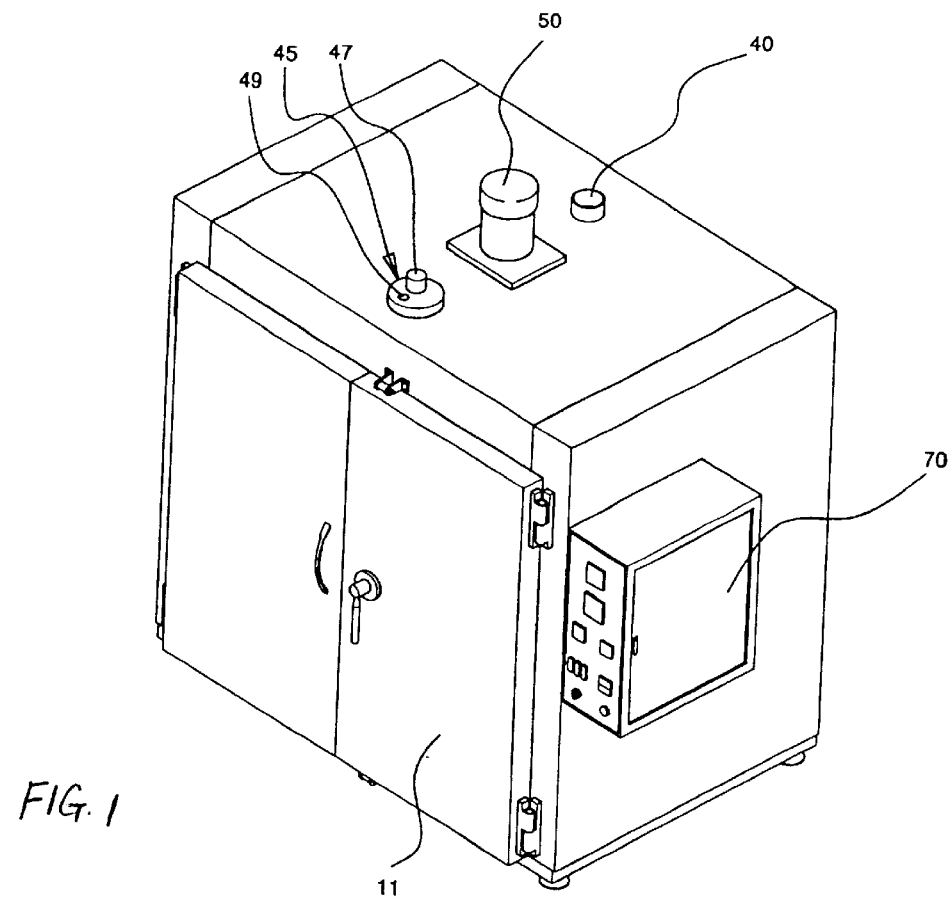
FIG. 1 is a perspective view of an egg roaster according to the present invention.
Figure 2:
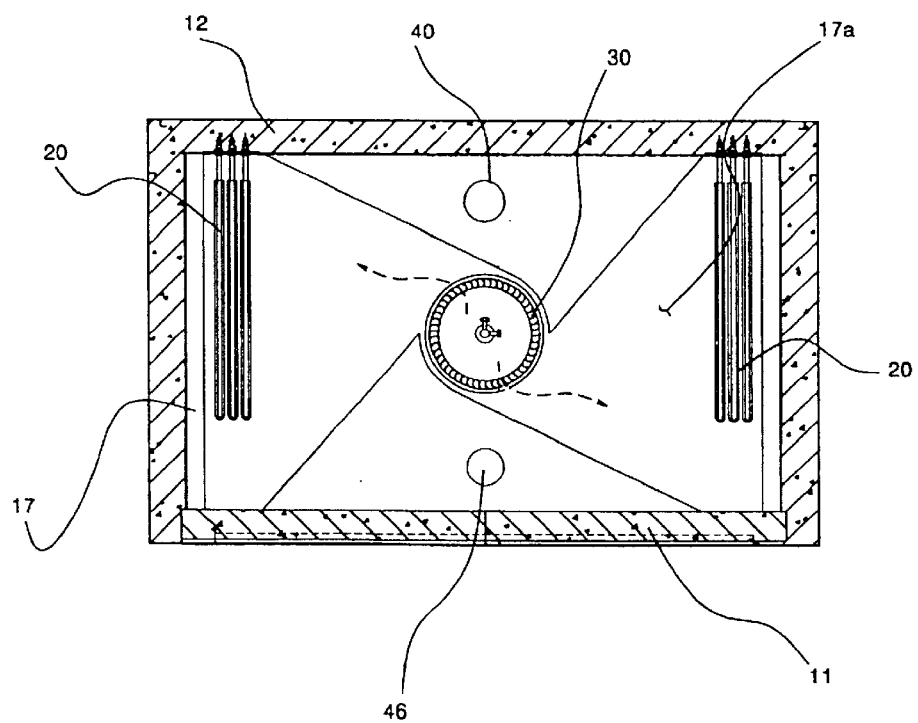
FIG. 2 is a horizontal cross-sectional view of FIG. 1.

With reference to the accompanying drawings, the present invention will now be described. As shown in FIGS. 1–4, the present invention is provided with a heating chamber 10 defined by a door set 11 consisting of one or more doors and walls comprising of a top wall 8, bottom wall 9, and vertical walls 12. The heating chamber 10 is of a predetermined volume. Each wall 8, 9, 12 is filled with an insulation material. Within the heating chamber 10 are provided a plurality of guide shelves 13 to load eggs thereon. Further, each vertical wall 12 has an inner wall 14 having holes 15 therethrough, wherein the guide shelves 13 are mounted on each inner wall 14 in an horizontal multi-story alignment.

Spaced from the vertical walls 12 are formed air vents 17. An electric heater 20 serving as a heat source is disposed in an upper portion of the heating chamber 10, wherein the upper portion of the heating chamber 10 communicates with the air vents 17.

In another upper portion of the chamber 10 are provided a fan 30 and a motor 50, wherein the motor 50 is fixed to an exterior portion of the top wall 8 and the fan 30 is axially engaged to the motor 50 so that the fan 30 and the motor 50 become placed in an air passage 17a communicating with the air vents 17 to serve as an air circulation device.

An air discharge hole 40 communicating with the chamber 10 is formed to the rear of a central portion of the top wall 8. An air influx member 45 is formed to the front of the central portion of the top wall 8 to administer the influx of air flowing in from the external atmosphere, wherein an air influx hole 46 in the air influx member 45 communicates with the chamber 10.

The air influx member 45 includes a cover 49, a knob 47 and a disk 48. The cover 49 has a hole 49 therethrough and is fixed to an external portion of the top wall 8. The knob 47 is provided on and above the cover 49. The disk 48 includes a through hole 48a. In this construction, the knob 47 and the disk 48 are axially engaged to each other to cover the air influx hole 46.

The air passage 17a is formed in a substantially triangular arrangement spreading from the fan 30 in order enable the maximize the spreading of the air by the fan 30 to the heater 20.

Meanwhile, a partition plate 60 is formed spaced from and over a lower end of the air influx hole 46. The partition plate is positioned to lead air drawn in through the air influx hole 46 toward the fan 30 without mixing with the air already contained within the chamber and promoting the circulation of air in the chamber 10. Here, the reference numeral 70 denotes a control box.

The thusly constituted present invention will now be explained in further detail.

In the egg roaster according to the present invention, target eggs for roasting are loaded on egg plates and mounted on each guide shelf 13 to fill the chamber 10. According to experiments, approximately 4,000 to 5,000 eggs are appropriate for commercial egg roasting so the loadable number of eggs in the chamber 10 may be determined accordingly.

When the eggs are loaded in the chamber 10, the door set 11 is closed and an egg roasting program becomes applied using the control box 70 to start the egg roasting.

The egg roasting temperature becomes gradually heightened and continues for about 20 to 30 minutes in accordance with a predetermined set of steps. The electric heater 20 is employed as heat source. The holes 15 formed between guide shelves 13 serve to supply heat wave therethrough. The fan 30 powered by the motor 50 serves to draw in and diffuse air in the chamber 10 into the air passage 17a so that the diffused air becomes heated as it passes the heater 20. The heated air is supplied through air vents 17 and at the same time diffused through the holes 15 on the inner wall of the vertical walls 12 and into the chamber. Such a repeated air circulation within the chamber 10 leads to egg roasting.

At this time, a discharge fan (not shown) may be provided at the air discharge hole 40 to intermittently, repeatedly discharge the air in the chamber 10. In order to supplement the external atmosphere into the chamber 10, the knob 47 of the air influx member 45 can be turned and adjusted to enable the hole 49 a in the cover 49 to communicate with the hole 48 a of the disk 48, thereby inhaling a desired amount of external atmosphere into the chamber 10.

Either to circulate and discharge the internal air or to inhale the external atmosphere is to prevent egg crusts from cracking due to high heat and obtain quality-roasted eggs.

The air inhaled for such a circulation in the chamber 10 turns to a heated air while passing the heater 20. The temperature variations due to the influx of the external atmosphere into the chamber 10 may result in the undesired type of roasted eggs so the partition plate 60 is provided to direct the influx air toward the fan 30.

The roasted eggs obtained using the egg roaster according to the present invention prove to contain low cholesterol with more calcium and protein while substantially realizing increased storage hours. The egg ingredients comparison table according to FDA analysis is as follows:

| Ingredients | Roasted Egg by This Roaster | Raw Egg |
| --- | --- | --- |
| Calories | 70 | 75 |
| Total fat | 4.5 g | 4.5 g |
| Saturated Fatty Acid | 1.6 g | 1.5 g |
| Cholesterol | 185 mg | 215 mg |
| Sodium | 75 mg | 65 mg |
| Total Carbohydrate | 0 g | 1 g |
| Dietary Fiber | 0 g | |
| Sugars | 0 g | |
| Proteins | 7 g | 6.25 g |
| Vitamin A | 3% | 6% |
| Calcium | 4% | 2% |
| Vitamin C | 0% | 0% |
| Iron | 16% | 4% |
| Ash | 0.48 g | 0.47 g |
| Moisture | 27.7 g | 37.7 g |
| Polyunsaturated Fat | 0.68 g | 0.68 g |
| Monounsaturated Fat | 1.92 g | 1.91 g |
| Monosaccharides | 0.03 g | |
| Disacchrides | 0 g | |
| Other Carbohydrate | 0.16 g | |

The above-specified egg ingredients analyses are based on one egg weighing 40 g. As shown in the above table, the increase of calcium and protein is substantially increased, whereas cholesterol is substantially lowered, in the roasted egg according to the present invention. The roasted egg becomes thoroughly sterilized and its storage becomes extended accordingly. Also, the acidity of the roasted egg is about pH 7.224. The food with acidity of over ph 7.5 is not sellable as edible. Further, the substantially decreased moisture prevents germ propagation.

As discussed above, the egg roaster according to the present invention enables even roasting of bulk eggs, thereby satisfying commercial demand while reserving productivity in egg roasting. Further, the egg roaster realizes a thorough sterilization without damaging eggs by use of air circulation mechanism and substantially extends storage period.

Although the invention has been described in considerable detail with reference to certain preferred versions thereof, other versions are possible by converting the aforementioned construction. Therefore, the scope of the invention shall not be limited by the specification specified above and the appended claims.

What is claimed is:

1. A roaster for roasting eggs using an electric heater, comprising:

an insulation chamber having an internal air circulator provided therein;

a plurality of guide shelves for loading eggs thereon mounted within said insulation chamber;

said air circulator forcing circulation and diffusion of internal air within said insulation chamber to evenly roast the eggs;

an air discharge unit for forceably discharging internal air to prevent egg burning and dewing from moisture; and, an external air influx member for regulating the supply of external air drawn into said insulation chamber.

2. The roaster as described in claim 1 wherein said insulation chamber is defined by one or more doors, a top wall, bottom wall, and vertical walls, said chamber being of a predetermined space, each wall being filled with an insulation material, said vertical walls having an inner wall within the heating chamber provided with a plurality of guide shelves to load eggs thereon and said inner walls further having a plurality of holes therethrough, said guide shelves being mounted on each inner wall in a horizontal multi-story alignment;

said roaster further comprising:

air vents formed spaced from said vertical walls;

an electric heater serving as a heat source disposed in an upper portion of the chamber, the upper portion of the heating chamber communicating with the air vents;

a fan and a motor provided in another upper portion of said chamber, said motor being position on an exterior portion of said top wall, said fan being axially engaged to said motor so that said fan and said motor become placed in an air passage communicating with said air vents to serve as an air circulation device;

an air discharge hole communicating with said chamber formed in a central rear portion of said top wall;

an air influx hole communicating with said chamber formed in front of said central portion of said top wall; and, an air influx member communicating with the air influx hole formed above said air influx hole to administer the influx of air from the external atmosphere.

3. The egg roaster as described in claim 2 wherein said air influx member includes a cover, a knob and a disk;

said cover having a hole therethrough and fixed to an external portion of said top wall;

said knob provided on and above the cover;

said disk including a hole therethrough;

said knob and said disk axially engaged to each other to cover said air influx hole.

4. The egg roaster as described in claim 2 wherein said air passage is tapered in a substantially triangular pattern spreading from said fan to enable said fan to spread air maximally towards said heater, wherein a partition plate is formed spaced from a lower end of said air influx hole, said partition plate being shaped and positioned to lead air drawn in from the external atmosphere through said air influx hole towards said fan and then into said chamber by said fan in a circulating manner.

5. A roaster for roasting eggs using an electric heater, comprising:

an insulation chamber defined by one or more doors, a top wall, a bottom wall, and vertical walls, said chamber being of a predetermined space, each wall being filled with an insulation material;

said vertical walls having an inner wall within the heating chamber provided with a plurality of guide shelves to load eggs thereon and said inner walls further having a plurality of holes therethrough, said guide shelves being mounted on each inner wall in a horizontal multi-story alignment;

an internal air circulator provided therein, said air circulator forcing circulation and diffusion of internal air within said insulation chamber to evenly roast said eggs;

an air discharge unit for forceably discharging internal air to prevent egg burning and dewing from moisture;

an external air influx member for regulating the supply of external air drawn into said insulation chamber;

air vents formed spaced from said vertical walls;

an electric heater serving as a heat source disposed in an upper portion of said chamber, said upper portion of said chamber communicating with said air vents;

a fan and a motor disposed in another upper portion of said chamber, said motor being position on an exterior portion of said top wall, said fan being axially engaged to said motor so that said fan and said motor become placed in an air passage communicating with said air vents to serve as an air circulation device;

an air discharge hole communicating with said chamber formed in a central rear portion of said top wall;

an air influx hole communicating with said chamber formed in front of said central portion of said top wall; and, an air influx member communicating with the air influx hole formed above said air influx hole to administer the influx of air from the external atmosphere.

6. The egg roaster as described in claim 5 wherein said air influx member includes a cover, a knob and a disk;

said cover having a hole therethrough and fixed to an external portion of said top wall;

said knob provided on and above the cover;

said disk including a hole therethrough;

said knob and said disk axially engaged to each other to cover said air influx hole.

7. The egg roaster as described in claim 5 wherein said air passage is tapered in a substantially triangular pattern spreading from said fan to enable said fan to spread air maximally towards said heater, wherein a partition plate is formed spaced from a lower end of said air influx hole, said partition plate being shaped and positioned to lead air drawn in from the external atmosphere through said air influx hole towards said fan and then into said chamber by said fan in a circulating manner.

8. A roaster for roasting eggs using an electric heater, comprising:

an insulation chamber is defined by one or more doors, a top wall, bottom wall, and vertical walls, said chamber being of a predetermined space, each wall being filled with an insulation material, internal air circulator provided therein;

a plurality of guide shelves for loading eggs thereon mounted within said insulation chamber;

said air circulator forcing circulation and diffusion of internal air within said insulation chamber to evenly roast the eggs;

an air discharge unit for forceably discharging internal air to prevent egg burning and dewing from moisture; and, an external air influx member for regulating the supply of external air drawn into said insulation chamber;

air vents are formed spaced from said vertical walls;

an electric heater serving as a heat source disposed in an upper portion of said chamber, the upper portion of the heating chamber communicating with the air vents;

an air influx hole communicating with said chamber is formed in front of a central portion of said top wall;

a fan and a motor provided on said upper portion of said chamber, said motor being position on an exterior portion of said top wall, said fan being axially engaged to said motor so that said fan and said motor become placed in an air passage communicating with said air vents to serve as an air circulation device; and, wherein said air passage is tapered in a substantially triangular pattern spreading from said fan to enable said fan to spread air maximally towards said heater, wherein a partition plate is formed spaced from a lower end of said air influx hole, said partition plate being shaped and positioned to lead air drawn in from the external atmosphere through said air influx hole towards said fan and then into said chamber by said fan in a circulating manner.

9. The roaster as described in claim 8 wherein said vertical walls have inner walls within the chamber chamber provided with a plurality of guide shelves to load eggs thereon, said inner walls further having a plurality of holes therethrough, said guide shelves being mounted on each inner wall in a horizontal multi-story alignment;

said roaster further comprising:

an air discharge hole communicating with said chamber formed in said central rear portion of said top wall; and, an air influx member communicating with said air influx hole is formed above said air influx hole to administer the influx of air from the external atmosphere.

10. The egg roaster as described in claim 9 wherein said air influx member includes a cover, a knob and a disk;

said cover having a hole therethrough and fixed to an external portion of said top wall;

said knob provided on and above the cover;

said disk including a hole therethrough;

said knob and said disk axially engaged to each other to cover said air influx hole.

* * * * *